J. T. STEWART.
CARBURETER.
No. 178,973. Patented June 20, 1876.
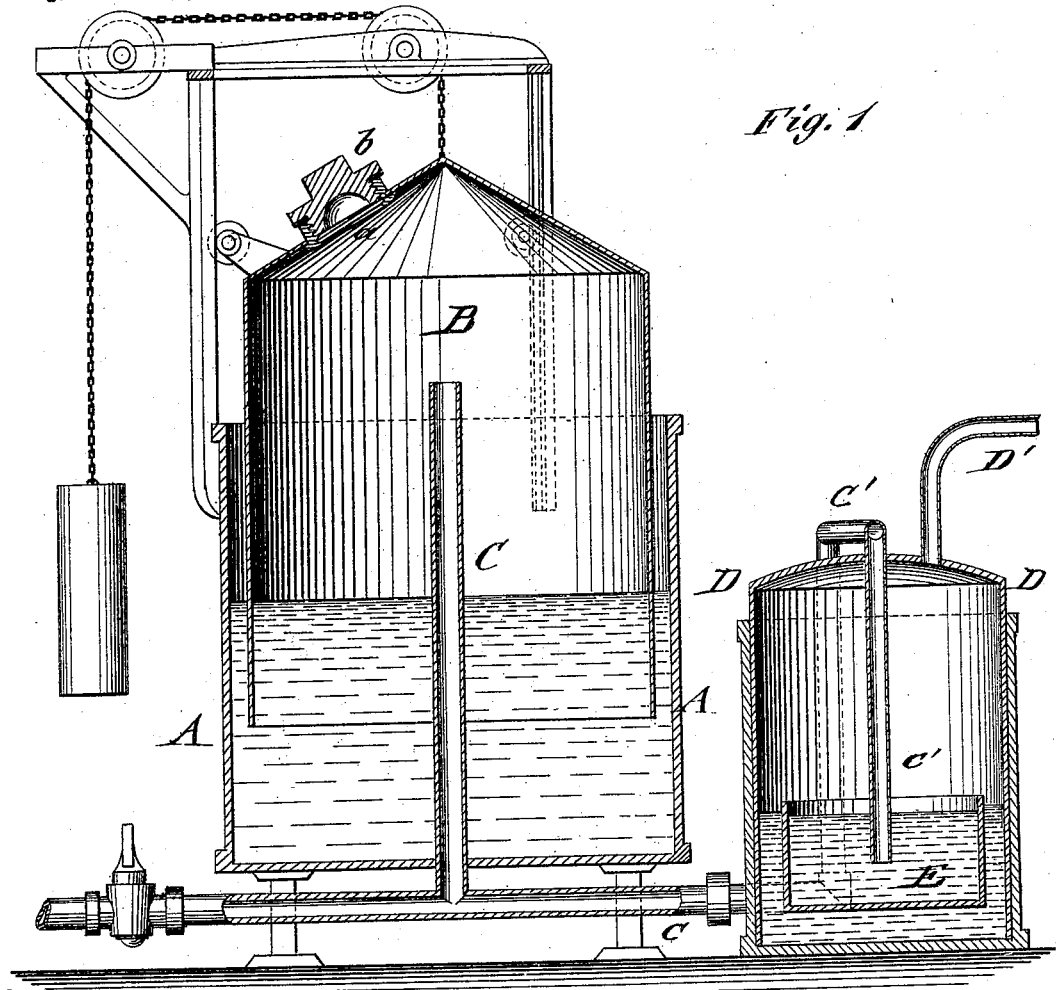
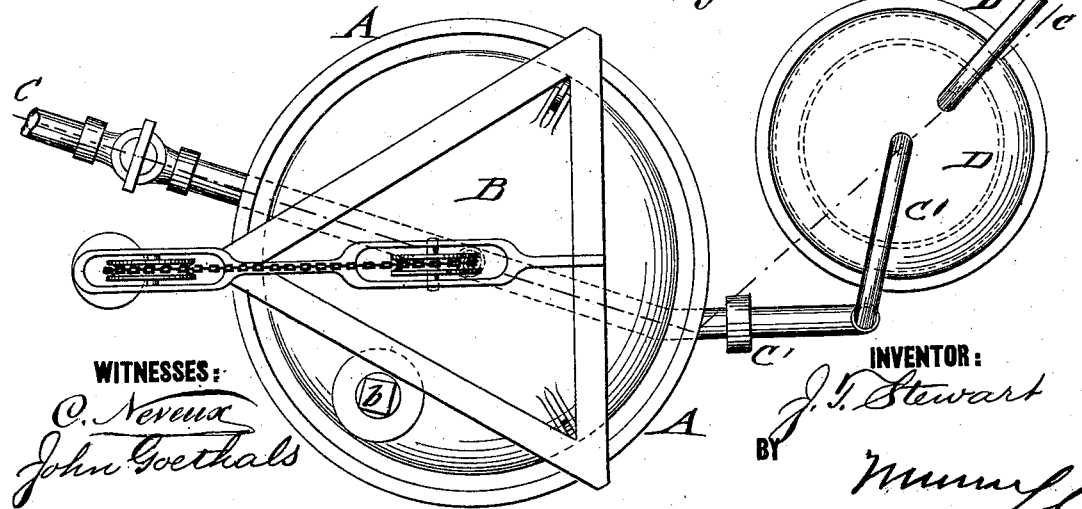
WITNESSES:
O. Neveux
John Goethals
INVENTOR:
J. T. Stewart
BY
ATTORNEYS.

UNITED STATES PATENT OFFICE.

JAMES T. STEWART, OF LOS ANGELES, CALIFORNIA, ASSIGNOR TO HIMSELF AND JAMES WILSON, OF SAME PLACE.

IMPROVEMENT IN CARBURETERS.

Specification forming part of Letters Patent No. 178,973, dated June 20, 1876; application filed February 21, 1876.

*To all whom it may concern:*

Be it known that I, JAMES T. STEWART, of Los Angeles, in the county of Los Angeles and State of California, have invented a new and Improved Gas-Machine, of which the following is a specification:

In the accompanying drawing, Figure 1 represents a vertical longitudinal section on line $c\,c$, Fig. 2, of my improved gas-machine; and Fig. 2, a top view of the same.

Similar letters of reference indicate corresponding parts.

My invention relates to an improved gas-machine of simple construction; and consists of an air-drum moving in a water-tank, and forcing the air through a connecting-pipe into a float filled with gasoline. The gasoline-pan is placed into a gas-holder filled with water, that raises the pan to keep the air-pipe always in the gasoline.

In the drawing, A represents a water-tank; B, the air-drum, of suitable dimensions, floating therein, being raised and lowered by rollers and weights along pillars in the nature of the drums or receptacles in gas-factories. The air is admitted into the interior of the air-drum B when raising the same, through a top aperture, $a$, that is closed by a screw-plug, $b$. An air-pipe, C, passes from the air-drum through the bottom of the water-tank, and is connected by a suitable coupling to a pipe, $C'$, of a gas-reservoir, D. The pipe $C'$ extends through the top of the gas-reservoir D, downward into a pan, E, filled with gasoline, and floating in the water, that forms the joint of the lower part of the gas-reservoir. The gas-reservoir D is made of an outer casing and an interior part that is closely fitted thereon and made to slide in the outer casing, for admitting the removal of the inner part when the coupling of the connecting-pipes is unscrewed, and thereby the floating pan is supplied with gasoline.

The lower part of the gas-reservoir is filled with water to close the same tightly and float the pan E, so that the air-pipe is always kept immersed in the gasoline, and the air compelled to pass through the same. The gradual evaporation of the gasoline causes the rising of the floating pan, and secures, thereby, the uninterrupted working of the machine by the immersion of the end of the air-pipe, the gas being drawn off through the exit-pipe $D'$, and the operation of the machine discontinued when no gas is used.

The gasoline in the floating tank is kept by the water at uniform temperature, so that the evaporation of gasoline by the passage of the air is also uniform, being not unnecessarily accelerated or retarded.

The entire apparatus is of very simple construction and operation, requiring only the refilling, from time to time, of the gasoline-pan, and the raising of the air-drum, which is the operating part of the machine.

Having thus described my invention, I claim as new and desire to secure by Letters Patent—

The combination of bottom-open air-drum B, movable up and down in the water of chamber A, and a gasoline-pan, E, floating in liquid and under the gas of reservoir D, the said drum and pan being connected by piping $C\,C'$, substantially as and for the purpose specified.

JAMES T. STEWART.

Witnesses:
 JOS. HUBER, Jr.,
 FRANK H. LATHROP.